3,577,401
POLYMERIZATION OF VINYL CHLORIDE USING AN IN-SITU INITIATOR AND A BASIC CALCIUM COMPOUND AS A BUFFER
Edwin Studley Smith, Cuyahoga Falls, Ohio, assignor to The Goodyear Tire & Rubber Company, Akron, Ohio
No Drawing. Filed Feb. 17, 1969, Ser. No. 799,953
Int. Cl. C08f *1/11, 1/60, 3/30*
U.S. Cl. 260—92.8
5 Claims

ABSTRACT OF THE DISCLOSURE

Process for making polyvinyl chloride having improved resistance to "plate out" using a basic calcium compound as a buffer in combination with a peroxydicarbonate initiator formed in-situ.

---

This invention relates to a process for making vinyl chloride resins, also referred to as PVC, having improved resistance to "plate out" as a result of using a combination of a peroxydicarbonate initiator formed in-situ and a basic calcium compound as a buffer in the polymerization reaction.

Organic peroxides are desirable initiators for the polymerization of vinyl chloride. Peroxydicarbonates when formed in-situ have come into favor because of economic and safety reasons as the preferred initiators.

The features and operation of the in-situ peroxydicarbonate initiator system are described in U.S. Pat. 3,022,281.

It has now been observed that when sodium bicarbonate and similar compounds are used as the buffering agent in the reaction as described in said patent, a problem referred to in the trade as "plate out" is encountered. "Plate out" refers to the undesirable withdrawal of an insoluble component present in the compounded PVC during sheet out of the PVC. After the PVC has been compounded with stabilizers, pigments, plasticizers and fillers in a mill, the resulting compounded PVC is placed in the bit of a calender roll and worked into a rolling bank of plastic melt which then feeds through the bit of the roll to form a thin sheet of PVC. As the melt is forced against the mirror smooth surface of the calender rolls, small portions of the insoluble components in the plastic melt are precipitated onto the surface of the rolls. In time it is noticed that the surface of the sheeted PVC is unsatisfactorily rough, uneven, or pit marked because the surfaces of the rolls are no longer mirror smooth.

It has now been discovered that when a basic calcium compound is used as the buffer to maintain the pH of the in-situ polymerization system above 7 in place of those buffers used in said patent, the resulting resin has improved "plate out" properties.

The following example is illustrative of the present invention.

EXAMPLE I

A conventional glass lined pressure vessel equipped with means for controlling the temperature and for agitating the contents is charged with 20 pounds of distilled water containing 13.5 grams of a suspension agent made up of 4.5 grams of Elvanol 32–70 (partially hydrolyzed polyvinyl acetate) and 9 grams of gelatin (85 Bloom Type B) and 7.0 grams of the buffering agent, calcium oxide. To this aqueous solution is added 2.05 grams of 50 percent $H_2O_2$ immediately followed by 10 pounds of vinyl chloride containing 3.0 grams of ethyl chloroformate. The polymerization was allowed to continue for 16 hours at 50° C. and the product recovered by conventional means.

EXAMPLE II.—CONTROL

Example I was repeated except that 10.0 grams of sodium bicarbonate was substituted for the 7 grams of calcium oxide.

The polymers from Examples I and II are made up into conventional compounds by adding various plasticizers, fillers, pigments and stabilizers on a mill and then processed into a thin sheet on a calender equipped with mirror smooth calender rolls. It was found that when the PVC was made with calcium oxide added as the buffer, even after 10 hours of sheeting on the calender, the surface of the sheet was still even and free of pit marks and other blemishes which would otherwise appear due to the accumulation of insoluble components on the surface of the rolls during the sheeting operation. However, when the PVC is made in the presence of sodium bicarbonate as the buffer, then after only 10 minutes of sheeting on the calender, pit marks and other blemishes begin to appear on the surface of the sheet as a result of the accumulation of insoluble components on the surface of the rolls. These components are believed to have been transferred, removed, withdrawn or precipitated (collectively referred to as plated out) from the PVC during the sheeting operation.

The basic calcium compounds that may be used in this invention are calcium acetate, calcium carbonate, calcium cinnamate, calcium formate, calcium hydroxide, calcium magnesium orthosilicate, calcium oxide, calcium orthophosphate, calcium pyrophosphate, calcium orthoplumbate, and calcium thiosulfate.

These basic calcium compounds when added to the medium are believed to convert to a form that will maintain the medium at a pH greater than 7.0 and may be used in amounts from about .01 to about 2 parts per 100 parts of vinyl chloride monomer.

While certain representative embodiments and details have been shown for the purpose of illustrating the invention, it will be apparent to those skilled in this art that various changes and modifications may be made therein without departing from the spirit or scope of the invention.

What is claimed is:
1. In the process of making a vinyl chloride resin having improved resistance to plate out which comprises polymerizing vinyl chloride in a medium containing water and an initiator resulting from the reaction of a peroxydicarbonate initiator producing component present in the vinyl chloride and reactive with a second component present in the water to produce said initiator, the improvement of having present in the medium a basic calcium compound.
2. The process of claim 1 wherein the calcium compound is calcium hydroxide.
3. The process of claim 1 wherein the calcium compound is present in an amount from about .01 to about 2 parts per 100 parts of monomer being polymerized.
4. The process of claim 1 wherein ethyl chloroformate is present in the vinyl chloride and hydrogen peroxide is present in the water.
5. The process of claim 1 wherein calcium oxide is used to produce the calcium compound.

References Cited

UNITED STATES PATENTS

| | | | |
|---|---|---|---|
| 2,981,724 | 4/1961 | Holdworth | 260—92.8W |
| 3,022,281 | 2/1962 | Smith | 260—92.8W |
| 3,100,763 | 8/1963 | Meek et al. | 260—92.8W |
| 3,488,328 | 1/1970 | Koyanagi | 260—92.8W |
| 3,493,551 | 2/1970 | Aoishi | 260—92.8W |

JOSEPH L. SCHOFER, Primary Examiner

J. A. DONAHUE, Jr., Assistant Examiner